United States Patent
Kinoshita et al.

(10) Patent No.: US 10,112,127 B2
(45) Date of Patent: Oct. 30, 2018

(54) METHOD FOR CONTROLLING FLOW VOLUME OF COAL/KEROSENE SLURRY, AND APPARATUS FOR PRODUCING UPGRADED BROWN COAL

(71) Applicant: KABUSHIKI KAISHA KOBE SEIKO SHO (KOBE STEEL, LTD.), Kobe-shi (JP)

(72) Inventors: Shigeru Kinoshita, Takasago (JP); Hiroki Watanabe, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 440 days.

(21) Appl. No.: 14/767,991

(22) PCT Filed: Apr. 2, 2014

(86) PCT No.: PCT/JP2014/059766
§ 371 (c)(1),
(2) Date: Aug. 14, 2015

(87) PCT Pub. No.: WO2014/175025
PCT Pub. Date: Oct. 30, 2014

(65) Prior Publication Data
US 2015/0375141 A1    Dec. 31, 2015

(30) Foreign Application Priority Data

Apr. 26, 2013    (JP) .................................. 2013-094460

(51) Int. Cl.
*B01D 21/26* (2006.01)
*B04B 1/20* (2006.01)
(Continued)

(52) U.S. Cl.
CPC .......... *B01D 21/262* (2013.01); *B01D 21/30* (2013.01); *B01D 21/34* (2013.01); *B04B 1/20* (2013.01);
(Continued)

(58) Field of Classification Search
CPC ...... B01D 21/262; B01D 21/30; B01D 21/34; C10L 1/322; C10L 2290/58; C10L 9/00;
(Continued)

(56) References Cited

U.S. PATENT DOCUMENTS 4,303,192 A * 12/1981 Katsume ................... B04B 1/20
494/10
4,432,747 A *  2/1984 Posse ..................... B04B 1/2016
494/53
(Continued)

FOREIGN PATENT DOCUMENTS

CN         1629261 A    6/2005
DE    10 2004 053581    6/2005
(Continued)

OTHER PUBLICATIONS

JP 53091465 Human Translation.*
(Continued)

*Primary Examiner* — Walter D. Griffin
*Assistant Examiner* — Shuyi S. Liu
(74) *Attorney, Agent, or Firm* — Oblon, McClelland, Maier & Neustadt, L.L.P.

(57) ABSTRACT

A method and apparatus that deterioration of the flow state of a coal/kerosene slurry while preventing the damage caused by overloading to thereby achieve excellent solid-liquid separation performance. In a solid-liquid separation supplying a dehydrated coal/kerosene slurry to a decanter-type centrifugal separator to separate the coal/kerosene slurry into a solid fraction and a liquid fraction, an opening degree target value is determined on the basis of the difference between a target value and an actually measured value of a torque that acts on a screw conveyor of the decanter-type centrifugal separator, and the opening degree of a flow volume control valve, which is arranged in the middle of a (Continued)

supply line for supplying the coal/kerosene slurry into the decanter-type centrifugal separator, is adjusted to the opening degree target value.

2 Claims, 3 Drawing Sheets

(51) Int. Cl.
| | | |
|---|---|---|
| *C10L 5/04* | (2006.01) | |
| *C10L 9/00* | (2006.01) | |
| *B04B 11/02* | (2006.01) | |
| *B04B 13/00* | (2006.01) | |
| *B01D 21/30* | (2006.01) | |
| *B01D 21/34* | (2006.01) | |
| *C10L 1/32* | (2006.01) | |

(52) U.S. Cl.
CPC .............. *B04B 11/02* (2013.01); *B04B 13/00* (2013.01); *C10L 1/322* (2013.01); *C10L 5/04* (2013.01); *C10L 9/00* (2013.01); *C10L 2290/50* (2013.01); *C10L 2290/54* (2013.01); *C10L 2290/58* (2013.01); *C10L 2290/60* (2013.01)

(58) Field of Classification Search
CPC .... C10L 5/04; C10L 2290/60; C10L 2290/50; C10L 2290/54; B04B 13/00; B04B 11/02; B04B 1/20
USPC .......................... 44/608, 629; 494/5, 8, 9, 10
See application file for complete search history.

(56) References Cited

U.S. PATENT DOCUMENTS

| | | |
|---|---|---|
| 2004/0026333 A1 | 2/2004 | Ruehrwein |
| 2005/0097814 A1* | 5/2005 | Sugita ........................ C10L 9/10 44/620 |
| 2012/0291342 A1 | 11/2012 | Sugita et al. |

FOREIGN PATENT DOCUMENTS

| | | | |
|---|---|---|---|
| JP | 53-91465 A | | 8/1978 |
| JP | 53091465 A | * | 8/1978 |
| JP | 01-65661 U | | 4/1989 |
| JP | 2005-139342 A | | 6/2005 |
| JP | 2010-116544 A | | 5/2010 |
| SU | 552109 A1 | | 3/1977 |

OTHER PUBLICATIONS

International Search Report and Written Opinion dated Jul. 1, 2014 for PCT/JP2014/059766 filed on Apr. 2, 2014.
Extended European Search Report dated Dec. 19, 2016 in Patent Application No. 14788246.8.
Jacques Smuts, "A Tutorial on Cascade Control", Retrieved from the Internet: URL:https://web.archive.org/web/20120802013140/http://blog.opticontrols.com/archives/105, XP55325599, 2012, pp. 1-5.

* cited by examiner

METHOD FOR CONTROLLING FLOW VOLUME OF COAL/KEROSENE SLURRY, AND APPARATUS FOR PRODUCING UPGRADED BROWN COAL

TECHNICAL FIELD

The present invention relates to; a method for controlling the flow volume of coal/kerosene slurry supplied into a decanter-type centrifugal separator in a solid-liquid separation process of using the decanter-type centrifugal separator; and an apparatus for producing upgraded brown coal.

BACKGROUND ART

A method of carrying out a solid-liquid separation process of using a decanter-type centrifugal separator, mechanically separating a solvent oil from dehydrated slurry, and thus obtaining cake has heretofore been known (refer to Patent Literature 1, for example).

Patent Literature 1, however, refers only to the point of separating a solid and a liquid (a cake and a solvent oil) by using a decanter-type centrifugal separator.

When dehydrated slurry (solid matter quantity) supplied to a decanter-type centrifugal separator increases (when the dehydrated slurry is coal/kerosene slurry, the case corresponds to the case where the flow volume itself is large and the case where the concentration of the contained coal is high), it sometimes happens that the dehydrated slurry gets clogged in the middle of a flow channel. Otherwise, it sometimes happens that the flow state of the dehydrated slurry deteriorates and a chattering phenomenon (mostly vibration and rattle of a rotary shaft) occurs. As a result, it sometimes happens that the load acting on the decanter-type centrifugal separator increases, damages component parts such as a gearbox and a bearing, and deteriorates solid-liquid separation performance.

CITATION LIST

Patent Literature

Patent Literature 1: Japanese Unexamined Patent Application Publication No. 2010-116544

SUMMARY OF INVENTION

Technical Problem

An object of the present invention is to provide a method for controlling the flow volume of coal/kerosene slurry and an apparatus for producing upgraded brown coal, which are capable of preventing the flow state of the coal/kerosene slurry from deteriorating and exhibiting excellent solid-liquid separation performance while preventing the damage caused by overloading.

Solution to Problem

The present invention provides, as a means for solving the above problem, a method for controlling the flow volume of coal/kerosene slurry wherein, in a solid-liquid separation process of supplying dehydrated coal/kerosene slurry to a decanter-type centrifugal separator and separating the coal/kerosene slurry into a solid fraction and a liquid fraction: an opening degree target value is decided on the basis of the difference between a target value and an actually measured value of a torque acting on a screw conveyer of the decanter-type centrifugal separator; and the opening degree of a flow control valve, which is arranged in the middle of a supply line for supplying the coal/kerosene slurry into the decanter-type centrifugal separator, is adjusted to the opening degree target value.

By the method, it is possible to: control a flow volume directly so as not to incur overload on the basis of a torque acting on a screw conveyer; and prevent component parts from being damaged. Further, the flow volume of coal/kerosene slurry supplied into a decanter-type centrifugal separator does not increase more than necessary. As a result, the flow state of the coal/kerosene slurry does not deteriorate and it is possible to prevent solid-liquid separation performance from deteriorating.

Further, the present invention provides, as a means for solving the above problem, a method for controlling the flow volume of coal/kerosene slurry wherein, in a solid-liquid separation process of supplying dehydrated coal/kerosene slurry to a decanter-type centrifugal separator and separating the coal/kerosene slurry into a solid fraction and a liquid fraction: a target value of the electric current supplied to a motor to rotate and drive a screw conveyer of the decanter-type centrifugal separator is decided so that the liquid level in a tank of the coal/kerosene slurry supplied to the decanter-type centrifugal separator may take a constant value; an opening degree target value is decided on the basis of the difference between the electric current target value and an actually measured value of the electric current supplied to the motor; and the opening degree of a flow control valve, which is arranged in the middle of a supply line for supplying the coal/kerosene slurry into the decanter-type centrifugal separator, is adjusted to the opening degree target value.

By the method, it is possible to: control a flow volume indirectly so that the force acting on a screw conveyer may not become overload on the basis of a value of the electric current supplied to a motor to rotate and drive the screw conveyer; prevent component parts from being damaged; and prevent solid-liquid separation performance from deteriorating.

Further, the present invention provides, as a means for solving the above problem, a method for controlling the flow volume of coal/kerosene slurry wherein, in a solid-liquid separation process of supplying dehydrated coal/kerosene slurry to a decanter-type centrifugal separator and separating the coal/kerosene slurry into a solid fraction and a liquid fraction: a target value of the electric current supplied to a motor to rotate and drive a screw conveyer of the decanter-type centrifugal separator is decided so that the liquid level in a tank of the coal/kerosene slurry supplied to the decanter-type centrifugal separator may take a constant value; a first opening degree target value of a flow control valve, which is arranged in the middle of a supply line for supplying the coal/kerosene slurry into the decanter-type centrifugal separator, is decided on the basis of the electric current target value; a second opening degree target value of the flow control valve is decided on the basis of the difference between a target value and an actually measured value of a torque acting on the screw conveyer of the decanter-type centrifugal separator; and the smaller of the first opening degree target value and the second opening degree target value is used as the opening degree of the flow control valve.

By the method, since the opening degree of a flow regulating valve is controlled in consideration of the liquid level of coal/kerosene slurry in a tank and an electric current value of a motor to rotate and drive a screw conveyer, it is possible to more appropriately prevent: the force acting on the screw conveyer from becoming overload; component parts from being damaged; and solid-liquid separation performance from deteriorating.

Further, the present invention provides, as a means for solving the above problem, a method for controlling the flow volume of coal/kerosene slurry wherein, in a solid-liquid separation process of supplying dehydrated coal/kerosene slurry to a decanter-type centrifugal separator and separating the coal/kerosene slurry into a solid fraction and a liquid fraction: a target value of the electric current supplied to a motor to rotate and drive a screw conveyer of the decanter-type centrifugal separator is decided so that the liquid level in a tank of the coal/kerosene slurry supplied to the decanter-type centrifugal separator may take a constant value; a first opening degree target value of a flow control valve, which is arranged in the middle of a supply line for supplying the coal/kerosene slurry into the decanter-type centrifugal separator, is decided on the basis of the electric current target value; a second opening degree target value of the flow control valve is decided on the basis of the difference between a target value and an actually measured value of a torque acting on the screw conveyer of the decanter-type centrifugal separator; a flow volume of the coal/kerosene slurry in the supply line ranging from the tank to the decanter-type centrifugal separator is decided so that the liquid level in the tank of the coal/kerosene slurry supplied to the decanter-type centrifugal separator may take a constant value and a third opening degree target value of a flow regulating valve is decided on the basis of the difference between the decided slurry flow volume and an actually measured value; and the smallest of the first opening degree target value, the second opening degree target value, and the third opening degree target value is used as the opening degree of the flow control valve.

By the method, since the opening degree of a flow regulating valve is controlled in consideration of the flow volume of coal/kerosene slurry flowing in a supply line in addition to the liquid level of the coal/kerosene slurry in a tank and an electric current value of a motor to rotate and drive a screw conveyer, it is possible to yet more appropriately prevent: the force acting on the screw conveyer from becoming overload; component parts from being damaged; and solid-liquid separation performance from deteriorating.

It is desirable that the opening degree of a flow control valve increases and decreases at a predetermined cycle of opening and closing of the flow control valve.

By the method, it is possible to appropriately prevent clogging of a supply line and defective flow by finely increasing and decreasing the flow volume of coal/kerosene slurry.

Further, the present invention provides, as a means for solving the above problem, an apparatus for producing upgraded brown coal including: a tank to retain coal/kerosene slurry; a decanter-type centrifugal separator having an outer rotary cylinder and a screw conveyer arranged relatively-rotatably in the outer rotary cylinder and driven by the drive of a motor; a supply line connecting the tank to the decanter-type centrifugal separator; a flow regulating valve being arranged in the supply line and regulating the flow volume of the coal/kerosene slurry; a torque detection sensor to detect a torque acting on the screw conveyer; and a control section that, in a solid-liquid separation process of using the decanter-type centrifugal separator, decides an opening degree target value on the basis of the difference between a target value of a torque acting on the screw conveyer and an actually measured value detected with the torque detection sensor and adjusts the opening degree of a flow control valve arranged in the middle of the supply line for supplying the coal/kerosene slurry into the decanter-type centrifugal separator to the opening degree target value.

Further, the present invention provides, as a means for solving the above problem, an apparatus for producing upgraded brown coal including: a tank to retain coal/kerosene slurry; a liquid level detection sensor for detecting the liquid level of the coal/kerosene slurry in the tank; a decanter-type centrifugal separator having an outer rotary cylinder and a screw conveyer arranged relatively-rotatably in the outer rotary cylinder and driven by the drive of a motor; a supply line connecting the tank to the decanter-type centrifugal separator; a flow regulating valve being arranged in the supply line and regulating the flow volume of the coal/kerosene slurry; and a control section that decides a target value of the electric current supplied to the motor to rotate and drive the screw conveyer of the decanter-type centrifugal separator so that the liquid level in the tank may take a constant value on the basis of a detected signal of the liquid level detection sensor, decides an opening degree target value on the basis of the difference between the electric current target value and an actually measured value of the electric current supplied to the motor, and adjusts the opening degree of a flow control valve arranged in the middle of the supply line for supplying the coal/kerosene slurry into the decanter-type centrifugal separator to the opening degree target value.

Further, the present invention provides, as a means for solving the above problem, an apparatus for producing upgraded brown coal including: a tank to retain coal/kerosene slurry; a liquid level detection sensor for detecting the liquid level of the coal/kerosene slurry in the tank; a decanter-type centrifugal separator having an outer rotary cylinder and a screw conveyer arranged relatively-rotatably in the outer rotary cylinder and driven by the drive of a motor; a supply line connecting the tank to the decanter-type centrifugal separator; a flow regulating valve being arranged in the supply line and regulating the flow volume of the coal/kerosene slurry; and a control section that decides a target value of the electric current supplied to the motor to rotate and drive the screw conveyer of the decanter-type centrifugal separator so that the liquid level in the tank may take a constant value on the basis of a detected signal of the liquid level detection sensor, decides a first opening degree target value of a flow control valve arranged in the middle of the supply line for supplying the coal/kerosene slurry into the decanter-type centrifugal separator on the basis of the electric current target value, decides a second opening degree target value of the flow control valve on the basis of the difference between a target value and an actually measured value of a torque acting on the screw conveyer of the decanter-type centrifugal separator, and uses the smaller of the first opening degree target value and the second opening degree target value as the opening degree of the flow control valve.

Further, the present invention provides, as a means for solving the above problem, an apparatus for producing upgraded brown coal including: a tank to retain coal/kerosene slurry; a liquid level detection sensor for detecting the liquid level of the coal/kerosene slurry in the tank; a decanter-type centrifugal separator having an outer rotary cylinder and a screw conveyer arranged relatively-rotatably in the outer rotary cylinder and driven by the drive of a motor; a supply line connecting the tank to the decanter-type centrifugal separator; a flow regulating valve being arranged in the supply line and regulating the flow volume of the coal/kerosene slurry; and a control section that decides a target value of the electric current supplied to the motor to rotate and drive the screw conveyer of the decanter-type centrifugal separator so that the liquid level in the tank may take a constant value on the basis of a detected signal of the liquid level detection sensor, decides a first opening degree target value of a flow control valve arranged in the middle of the supply line for supplying the coal/kerosene slurry into the decanter-type centrifugal separator on the basis of the electric current target value, decides a second opening degree target value of the flow control valve on the basis of the difference between a target value and an actually measured value of a torque acting on the screw conveyer of the decanter-type centrifugal separator, decides the flow volume of the coal/kerosene slurry in the supply line ranging from the tank to the decanter-type centrifugal separator so that the liquid level in the tank of the coal/kerosene slurry supplied to the decanter-type centrifugal separator may take a constant value, decides a third opening degree target value of the flow regulating value on the basis of the difference between a decided slurry flow volume and an actually measured value, and uses the smallest of the first opening degree target value, the second opening degree target value, and the third opening degree target value as the opening degree of the flow control valve.

It is desirable that a control section increases and decreases the opening degree of a flow control valve at a predetermined cycle.

Advantageous Effects of Invention

According to the present invention, since the flow volume of coal/kerosene slurry supplied to a decanter-type centrifugal separator is controlled, it is possible to effectively prevent: the decanter-type centrifugal separator from being overloaded and being mechanically damaged; or solid-liquid separation performance from deteriorating. As a result, it is possible to stabilize an upgraded brown coal process.

DESCRIPTION OF EMBODIMENTS

Embodiments according to the present invention are explained hereunder in reference to the attached drawings.

First Embodiment

Figure 1:
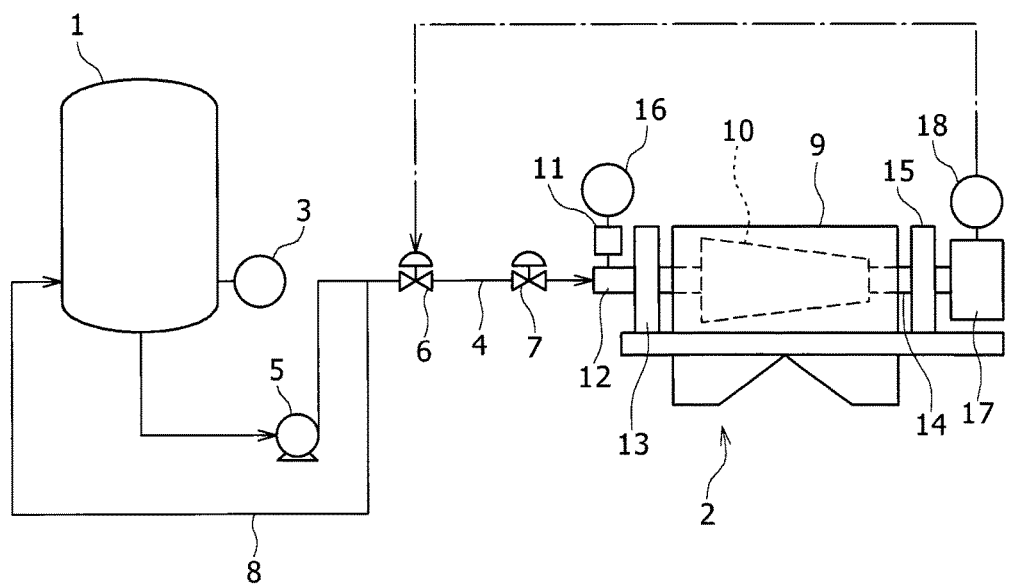
FIG. 1 is a view showing the outline of an upgraded brown coal producing apparatus according to First Embodiment.

FIG. 1 shows the outline of an upgraded brown coal producing apparatus according to First Embodiment. The upgraded brown coal producing apparatus includes a tank 1 to retain coal/kerosene slurry and a decanter-type centrifugal separator 2 to separate the coal/kerosene slurry supplied from the tank 1 into a solid fraction and a liquid fraction.

The coal/kerosene slurry is supplied arbitrarily to the tank 1. Usually the coal/kerosene slurry is supplied so that a liquid level in the tank 1 may be maintained at a nearly constant level. The liquid level of the coal/kerosene slurry in the tank 1 is detected by a liquid level detection sensor 3.

A pump 5, a first valve 6, and a second valve 7 are connected in sequence from the side of the tank in the middle of a supply line 4 ranging from the tank 1 to the decanter-type centrifugal separator 2. The role of the first valve 6 is to regulate the flow volume of the coal/kerosene slurry supplied into the decanter-type centrifugal separator 2. The role of the second valve 7 is to increase and decrease the flow volume of the coal/kerosene slurry in a predetermined range in the supply line 4 (the detail will be explained in Fifth Embodiment that will be described later). Further, a reflux line 8 to connect a point between the pump 5 and the first valve 6 to the tank 1 is arranged.

The decanter-type centrifugal separator 2 is configured by arranging a cylindrical body 10, which contains a screw conveyer (not shown in the figure), in a separator main body 9. A rotary cylindrical section 12 to rotate by the drive of a motor 11 protrudes from an end section of the screw conveyer. The rotary cylindrical section 12 is supported rotatably by a support plate 13 arranged on the one end side of the separator main body 9. Further, the rotary cylindrical section 12 is connected to the supply line 4 and the coal/kerosene slurry flows in the interior. A rotary shaft 14 protrudes from the other end section of the screw conveyer and is supported rotatably by a support plate 15 arranged on the other end side of the separator main body 9. The rotary torque of the screw conveyer is detected by a torque meter 16. The rotary torque detected by the torque meter 16 is converted into an electric signal (4 to 20 mA DC) by a transmitter 17 and transmitted to a regulator 18. The regulator 18 outputs a control signal to the first valve 6 on the basis of the received detected value of the rotary torque and regulates the opening degree thereof. Although it is not shown in the figure, a solid substance discharge port for discharging a cake (solid substance) obtained by separating a solid from a liquid and a liquid substance discharge port for discharging a liquid substance are formed at the other end section of the separator main body 9.

In an upgraded brown coal producing apparatus configured as stated above, coal/kerosene slurry is separated into a solid fraction and a liquid fraction as follows.

Firstly, on the basis of the relationship between the supply load condition of coal/kerosene slurry supplied to the decanter-type centrifugal separator 2 (the flow volume of coal/kerosene slurry, the concentration of a solid substance contained in the coal/kerosene slurry, or the like; the flow volume of the coal/kerosene slurry is used here) and a torque set value of the decanter-type centrifugal separator 2, a torque target value (SV value: Set Variable) is set beforehand on the basis of an empirical value such as an experimental result.

Then it is also possible to: actually drive the decanter-type centrifugal separator 2; and fine-tune the torque target value (SV value) on the basis of the rotary torque detected by a torque detection sensor (torque detected value).

Successively, an operator inputs the torque target value (SV value) through a DCS (Distributed Control System) in accordance with the difference of the operation condition of the decanter-type centrifugal separator 2 and other conditions. Then feedback control (here, PID control) is applied on the basis of the deviation between the inputted torque target value (SV value) and a torque detected value (PV value: Pressure Variable) sent from the transmitter 17 and an obtained computation value (MV value: Manipulative Variable) is transmitted to the first valve 6 as a manipulation signal. As a result, the opening degree of the first valve 6 is changed in accordance with the manipulation signal and the flow volume is adjusted.

Concretely, the opening degree of the first valve 6 is decided in accordance with the following expression.

$$MV = \frac{100}{PB} \times \left\{ e(t) \times \frac{1}{Ti} \times \int e(t)dt + Td \times \frac{de(t)}{dt} \right\} \quad [\text{Exp. 1}]$$

Mv(t): Control output,
e(t): Control deviation (torque target value SV−torque detected value PV),
PB: Proportional band (%),
Ti: Integral time (min.), and
Td: Derivative time (min.)
(PB, Ti, and Td are regulation parameter of control deviation).

The coal/kerosene slurry is supplied from the tank 1 to the decanter-type centrifugal separator 2 by driving the pump 5 while the opening degree of the first valve 6 is regulated as stated above. In the decanter-type centrifugal separator 2, the screw conveyer rotates by the drive of the motor 11 and the coal/kerosene slurry supplied into the rotary cylindrical section 12 is separated into a solid fraction and a liquid fraction. The separated solid substance and liquid substance are discharged from the solid substance discharge port and liquid substance discharge port, respectively.

According to First Embodiment, since the opening degree of the first valve 6 is regulated on the basis of the rotary torque (torque target value SV and torque detected value PV) of the screw conveyer, it is possible to: control the flow volume of the coal/kerosene slurry so as not to overload the decanter-type centrifugal separator 2; and prevent the solid-liquid separation performance from deteriorating.

Second Embodiment

Figure 2:
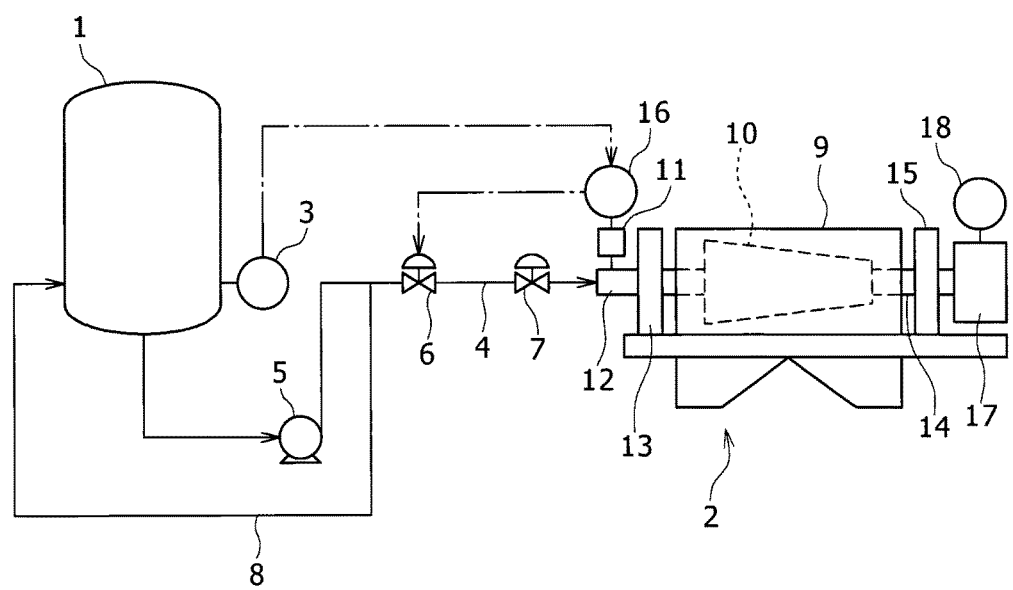
FIG. 2 is a view showing the outline of an upgraded brown coal producing apparatus according to Second Embodiment.

FIG. 2 shows the outline of an upgraded brown coal producing apparatus according to Second Embodiment. The upgraded brown coal producing apparatus is different from an apparatus according to First Embodiment on the following point. Here, in the following explanations, a part corresponding to a configuration according to First Embodiment is represented by an identical code and the explanation thereof is omitted.

The torque meter 16 only detects a rotary torque acting on the screw conveyer and is not used for controlling the opening degree of the first valve 6. Then the value of the electric current applied to the motor 11 to rotate the screw conveyer and the opening degree of the first valve 6 are controlled as follows on the basis of a detection signal of the liquid level detection sensor 3 to detect the liquid level of the coal/kerosene slurry in the tank 1.

That is, cascade control is applied on the basis of the liquid level detected by the liquid level detection sensor 3 and the electric current value of the motor 11 and a set value (SV value) of the electric current applied to the motor 11 is decided so that the liquid level in the tank 1 may take a constant value. Then a computation value (MV value) is calculated in accordance with the expression [Exp.1] stated earlier on the basis of the deviation between the decided set value (SV value) and an actually measured value (PV value), which is detected by a torque detection sensor, of the rotary torque of the screw conveyer. Then the opening degree of the first valve 6 is controlled in accordance with the calculated computation value.

According to Second Embodiment, since the value of the electric current applied to the motor 11 to rotate the screw conveyer and the opening degree of the first valve 6 are controlled on the basis of the liquid level of the coal/kerosene slurry in the tank 1, it is possible to: control the flow volume of the coal/kerosene slurry so as not to overload the decanter-type centrifugal separator 2 while the liquid level of the coal/kerosene slurry in the tank 1 is maintained at a constant level; and prevent the solid-liquid separation performance from deteriorating.

Third Embodiment

Figure 3:
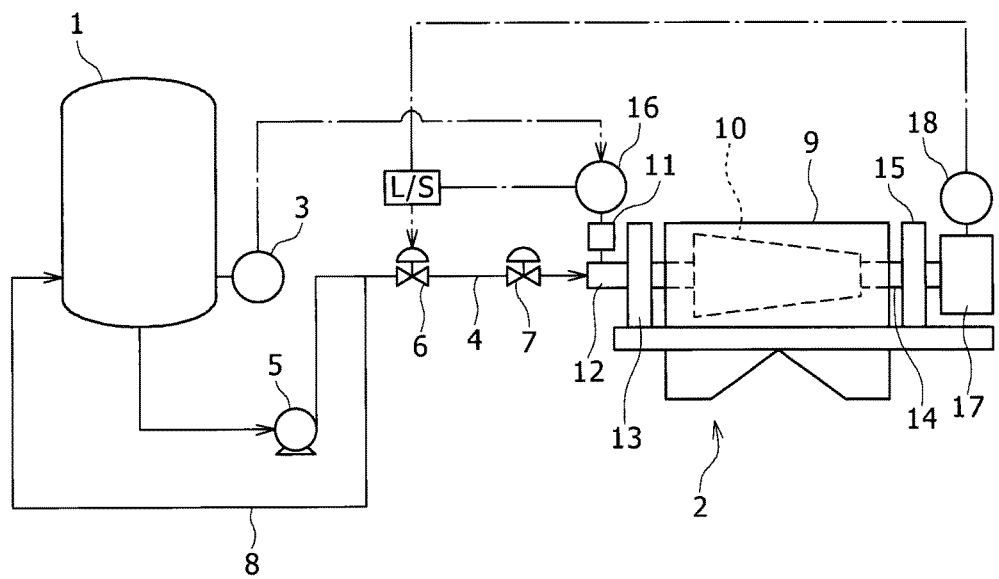
FIG. 3 is a view showing the outline of an upgraded brown coal producing apparatus according to Third Embodiment.

FIG. 3 shows the outline of an upgraded brown coal producing apparatus according to Third Embodiment. The upgraded brown coal producing apparatus is different from apparatuses according to First Embodiment and Second Embodiment on the following point. Here, in the following explanations, a part corresponding to a configuration according to First Embodiment or Second Embodiment is represented by an identical code and the explanation thereof is omitted.

In the same manner as First Embodiment, a first torque target value (SV1 value) is set on the basis of the relationship between the supply load condition of coal/kerosene slurry supplied to the decanter-type centrifugal separator 2 and a torque set value of the decanter-type centrifugal separator 2. Then a first computation value (MV1 value), which is a first opening degree target value, is calculated in accordance with the [Exp.1] on the basis of the deviation between the first torque target value (SV1 value) that has been set and a first actually measured value (PV1 value), which is detected by the torque detection sensor, of the rotary torque of the screw conveyer.

Further, in the same manner as Second Embodiment, cascade control is applied on the basis of a liquid level detected by the liquid level detection sensor 3 and an electric current value of the motor 11, and a second set value (SV2 value) of the electric current supplied to the motor 11 is decided so that the liquid level in the tank 1 may take a constant value. Then a second computation value (MV2 value) that is a second opening degree target value is calculated in accordance with the [Exp.1] on the basis of the deviation between the decided second set value (SV2 value) and a second actually measured value (PV2 value) of the electric current supplied to the motor 11 to rotate the screw conveyer.

Then the calculated first computation value (MV1 value) and second computation value (MV2 value) are compared (Low Select) and the opening degree of the first valve 6 is controlled on the basis of the smaller computation (electric current) value.

According to Third Embodiment, since the opening degree of the first valve 6 is regulated by the smaller of the first computation value (MV1 value) and the second computation value (MV2 value), rapid change of the opening degree does not occur. As a result, it is possible to appropriately separate the coal/kerosene slurry into a solid fraction and a liquid fraction while the coal/kerosene slurry is conveyed in a more stable state in comparison with First Embodiment and Second Embodiment.

Fourth Embodiment

Figure 4:
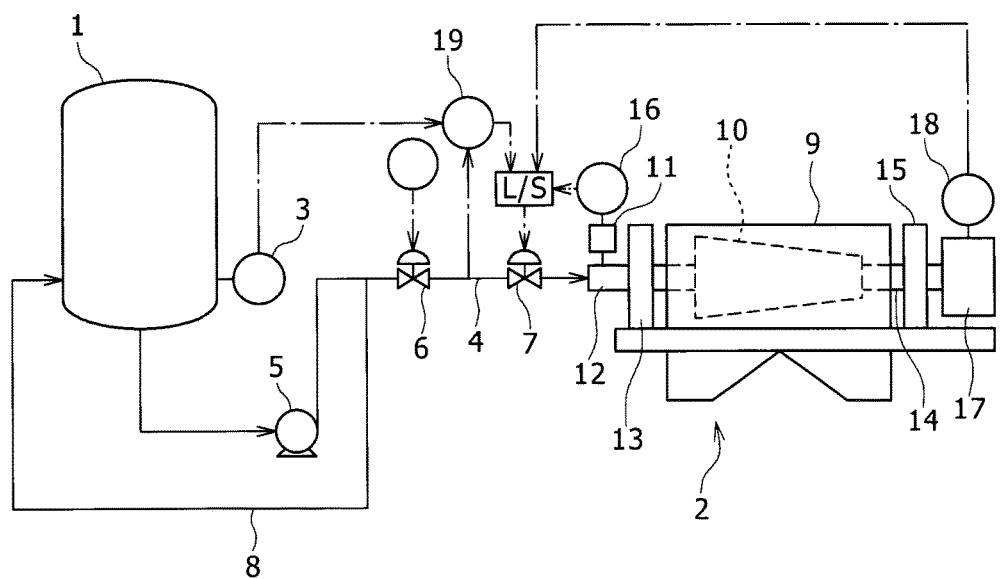
FIG. 4 is a view showing the outline of an upgraded brown coal producing apparatus according to Fourth Embodiment.

FIG. 4 shows the outline of an upgraded brown coal producing apparatus according to Fourth Embodiment. The upgraded brown coal producing apparatus is different from an apparatus according to First Embodiment on the following point. Here, in the following explanations, a part corresponding to a configuration according to First Embodiment is represented by an identical code and the explanation thereof is omitted.

In the same manner as First Embodiment, a first torque target value (SV1 value) is set on the basis of the relationship between the supply load condition of coal/kerosene slurry supplied to the decanter-type centrifugal separator 2 and a torque set value of the decanter-type centrifugal separator 2. Then a first computation value (MV1 value) that is a first target opening degree is calculated in accordance with the [Exp.1] on the basis of the deviation between the first torque target value (SV1 value) that has been set and a first actually measured value (PV1 value), which is detected by the torque detection sensor, of the rotary torque of the screw conveyer.

Further, in the same manner as Second Embodiment, cascade control is applied on the basis of a liquid level detected by the liquid level detection sensor 3 and an electric current value of the motor 11, and a second set value (SV2 value) of the electric current supplied to the motor 11 is decided so that the liquid level in the tank 1 may take a constant value. Then a second computation value (MV2 value) that is a second target opening degree is calculated in accordance with the [Exp.1] on the basis of the deviation between the decided second set value (SV2 value) and a second actually measured value (PV2 value) of the electric current supplied to the motor 11 to rotate the screw conveyer.

Further, a slurry flow volume to be a target is decided so that the liquid level of the coke/kerosene slurry in the tank 1 may take a constant value. Furthermore, a slurry flow meter 19 is arranged in the supply line 4 and the flow volume of the coke/kerosene slurry flowing in the supply line 4 is detected. Then cascade control is applied on the basis of the deviation between the target value of the slurry flow volume and the detected value of the slurry flow volume detected by the slurry flow meter 19 and a third computation value (MV3 value) that is a third opening degree target value is calculated by the [Exp.1].

Successively, the opening degree of the first valve 6 is controlled on the basis of the smallest value of the calculated first computation value (MV1), second computation value (MV2), and third computation value (MV3).

According to Fourth Embodiment, since the opening degree of the first valve 6 is subjected to feedback control on the basis of the smallest value of the first computation value (MV1), the second computation value (MV2), and additionally the third computation value (MV3) of the first valve 6 calculated from the set value (SV3 value) and the actually measured value (PV3) of the slurry flow volume, it is possible to appropriately separate the coal/kerosene slurry into a solid fraction and a liquid fraction while the coal/kerosene slurry is conveyed in a still more stable state in comparison with Third Embodiment.

Fifth Embodiment

In an upgraded brown coal producing apparatus according to Fifth Embodiment, the following control capable of being adopted in any of the configurations according to First to Fourth Embodiments is applied.

Figure 5:
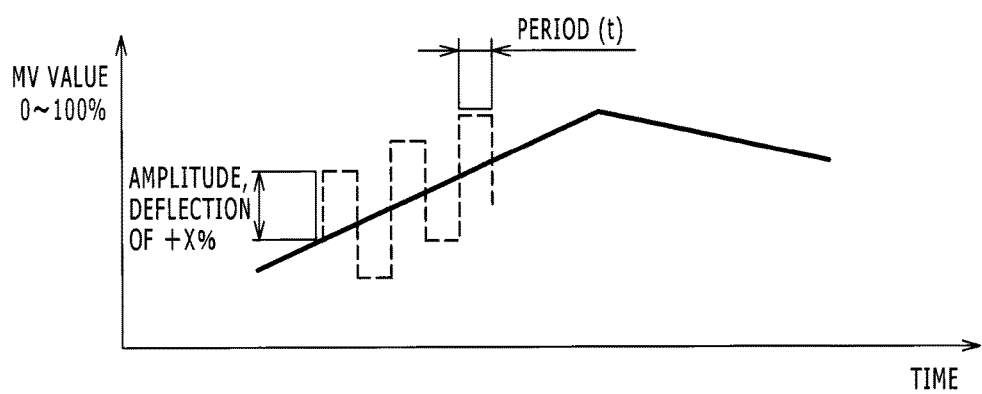
FIG. 5 is a graph showing the change of a flow volume in a supply line of an upgraded brown coal producing apparatus according to Fifth Embodiment.

That is, a tiny variation is given to the opening degree of the first valve 6 in the supply line 4. Concretely, as shown in the graph of FIG. 5, the opening degree of the first valve 6 is increased and decreased at a constant period (t) and so-called tact control is applied. As a result, it is possible to prevent the clogging of the supply line 4, in particular the first valve 6. Here, the period (t) and the amplitude of the increase and decrease (±X %: for example ±1%) may arbitrarily be set in response to the flow condition (the difference of the inner diameter of the supply line 4 and others) of the coal/kerosene slurry and can be set at appropriate values by experiment or the like. Further, when tact control is applied by the first valve 6, it is also possible to apply flow control by changing the opening degree of the first valve 6 or by changing the opening degree of the second valve 7.

According to Fifth Embodiment, it is possible to effectively prevent the clogging of the coal/kerosene slurry in the supply line 4, in particular in the flow control valve by increasing and decreasing the flow volume of the coal/kerosene slurry in the supply line 4 in a certain range.

REFERENCE SIGNS LIST

1 Tank
2 Decanter-type centrifugal separator
3 Liquid level detection sensor
4 Supply line
5 Pump
6 First valve (flow control valve)
7 Second valve
8 Reflux line
9 Separator main body
10 Cylindrical body
11 Motor
12 Rotary cylindrical section
13 Support plate
14 Rotary shaft
15 Support plate
16 Torque meter
17 Transmitter
18 Regulator

The invention claimed is:

1. A method for controlling the flow volume of coal/kerosene slurry in a solid-liquid separation process of supplying dehydrated coal/kerosene slurry to a decanter-type centrifugal separator and separating the coal/kerosene slurry into a solid fraction and a liquid fraction, comprising:
    deciding an opening degree target value on the basis of the difference between a torque target value and a value of a torque acting on a screw conveyer of the decanter-type centrifugal separator measured by a torque detection sensor;
    adjusting the opening degree of a flow control valve to the opening degree target value, wherein the flow control valve is arranged in the middle of a supply line for supplying the coal/kerosene slurry into the decanter-type centrifugal separator;
    driving the decanter-type centrifugal separator; and
    adjusting the torque target value on the basis of the rotary torque detected by the torque detection sensor.

2. A method for controlling the flow volume of coal/kerosene slurry according to claim 1, wherein the opening degree of the flow control valve increases and decreases at a predetermined cycle of opening and closing of the flow control valve.

* * * * *